United States Patent
Kumar et al.

(10) Patent No.: US 8,701,021 B2
(45) Date of Patent: Apr. 15, 2014

(54) CAPABILITY TO BUILD MULTIPLE APPLICATION VIEWS FROM A SINGLE SYSTEM MODEL

(75) Inventors: Jeetendra Kumar, Boise, ID (US); Peter Neisen, Boise, ID (US); Nataraj Kumar Gobbak, Boise, ID (US); Yahya Pareed, Boise, ID (US); Kevin Vadnais, Boise, ID (US); Jeffrey Sean Fresk, Boise, ID (US); Joseph Knosp, Boise, ID (US); Matthew M. Boam, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1349 days.

(21) Appl. No.: 11/496,319

(22) Filed: Jul. 31, 2006

(65) Prior Publication Data
US 2008/0065739 A1     Mar. 13, 2008

(51) Int. Cl.
*G06F 3/00*     (2006.01)
*G06F 17/30*    (2006.01)

(52) U.S. Cl.
CPC .................. *G06F 17/30905* (2013.01)
USPC ........................................ 715/760; 715/761

(58) Field of Classification Search
USPC ................................................. 715/760, 761
See application file for complete search history.

(56) References Cited

U.S. PATENT DOCUMENTS

| | | | |
|---|---|---|---|
| 4,928,247 A | 5/1990 | Doyle et al. | |
| 5,461,488 A | 10/1995 | Witek | |
| 5,539,530 A * | 7/1996 | Reifman et al. | 358/402 |
| 5,555,104 A * | 9/1996 | Todaka | 358/468 |
| H1677 H | 9/1997 | Hu et al. | |
| 5,724,555 A | 3/1998 | Wadsworth | |
| 5,727,136 A | 3/1998 | Kubota | |
| 5,835,577 A | 11/1998 | Disanto et al. | |
| 5,872,901 A | 2/1999 | Konno et al. | |
| 5,877,746 A | 3/1999 | Parks et al. | |
| 6,100,995 A | 8/2000 | Itoh | |
| 6,270,271 B1 * | 8/2001 | Fujiwara | 400/693 |
| 6,327,613 B1 * | 12/2001 | Goshey et al. | 709/208 |
| 6,704,804 B1 * | 3/2004 | Wilson et al. | 719/315 |
| 6,775,712 B2 | 8/2004 | Sakai et al. | |
| 6,789,111 B1 * | 9/2004 | Brockway et al. | 709/222 |
| 6,801,328 B2 | 10/2004 | Tsukamoto et al. | |
| 6,944,689 B2 * | 9/2005 | Billington et al. | 710/62 |
| 6,957,417 B2 | 10/2005 | Turner et al. | |

(Continued)

FOREIGN PATENT DOCUMENTS

| | | |
|---|---|---|
| EP | 0646857 | 12/1998 |
| EP | 0965923 | 12/1999 |

(Continued)

OTHER PUBLICATIONS

"Implementing a Management System Architecture Framework" by Goers, W.C., and Brenner, M.R. published in Bell Labs Technical Journal Oct.-Dec. 2000.

(Continued)

*Primary Examiner* — David Phantana Angkool

(57) ABSTRACT

An embedded marker system includes a plurality of devices communicatively coupled to a single system model. The system further includes a plurality of application views configured to communicate with the system model to obtain status and configuration data associated with one of the plurality of devices.

24 Claims, 4 Drawing Sheets

(56) References Cited

U.S. PATENT DOCUMENTS

| | | | |
|---|---|---|---|
| 6,963,936 B2* | 11/2005 | Billington et al. ............... 710/62 |
| 6,980,312 B1* | 12/2005 | Czyszczewski et al. ..... 358/1.15 |
| 7,149,978 B1* | 12/2006 | Maffezzoni ................... 715/762 |
| 8,504,729 B2* | 8/2013 | Pezzutti ........................ 709/250 |
| 2002/0131636 A1* | 9/2002 | Hou ........................ 382/181 |
| 2002/0184610 A1 | 12/2002 | Chong et al. |
| 2003/0013483 A1* | 1/2003 | Ausems et al. ............... 455/556 |
| 2004/0019684 A1 | 1/2004 | Potter et al. |
| 2004/0021698 A1* | 2/2004 | Baldwin et al. ............... 345/853 |
| 2004/0036905 A1 | 2/2004 | Chang |
| 2005/0179961 A1* | 8/2005 | Czyszczewski et al. ...... 358/468 |
| 2009/0238349 A1* | 9/2009 | Pezzutti ..................... 379/93.02 |
| 2013/0179360 A1* | 7/2013 | Baker et al. ................... 705/325 |

FOREIGN PATENT DOCUMENTS

| | | |
|---|---|---|
| EP | 1030507 | 8/2000 |
| EP | 1170939 | 1/2002 |
| EP | 1331762 | 7/2003 |
| EP | 1445711 | 8/2004 |
| GB | 2345813 | 7/2000 |
| JP | 8289065 | 11/1996 |
| JP | 10032657 | 2/1998 |
| JP | 10126564 | 5/1998 |
| JP | 2002324017 | 11/2002 |
| JP | 2003337664 | 11/2003 |
| JP | 2004023194 | 1/2004 |
| WO | WO-95/30958 | 11/1995 |
| WO | WO-2005/096132 | 10/2005 |
| WO | WO-2006/045903 | 5/2006 |

OTHER PUBLICATIONS

Middleware Management (What's Hot) (NasTel Technologies' AutoPilot) (Brief Article)(Product Announcement) Published in Information Week Sep. 27, 1999.

"BMC Offers a New View of the Network" published in Computergram International Dec. 10, 1996.

Distributed Control Engine for Collaboration Based on T.128; by Kim, M H; Oh, J.B. published in Proceedings of SPIE, the International Society for Optical Engineering Proceedings of SPIE; published 1999.

"HP Printer Management Software Aims for Centralized Control"; published in Computergram International on Nov. 26, 1997.

Share and Share Alike (Share and Share Alike—PCsync makes file transfers and synchronization easy across a variety of connections.)(Software Review)(Evaluation); published at WinMag.com on Feb. 1, 2001.

* cited by examiner

CAPABILITY TO BUILD MULTIPLE APPLICATION VIEWS FROM A SINGLE SYSTEM MODEL

BACKGROUND

Embedded marker systems such as printers, multi-function printers, and copiers generally include an embedded controller configured to implement a variety of user functions through a plurality of user interfaces. One of the more common marking systems is the multi-function printer, which is often referred to as an "all-in-one" system because it includes a collection of devices that perform multiple device functions like printing, faxing, scanning, and other digital communications. These device functions are generally accessed by users through a plurality of user interfaces such as, but not limited to, a device control panel, an embedded web server (EWS), a Web Jet Admin (WJA) and various print drivers.

Specific tasks initiated by the user (i.e., applications) are implemented within the multi-function printer through the controller and what are known as system models and application views. System models manage behavior and data for each application implemented by a given user interface, while an application view obtains data from the system model and presents the data to the user. Conceptually, an application view is the functional link between the system model and the view as seen by the user.

In known multi-function printer configurations, there are dedicated system models for each available user interface. This multiple system model approach undesirably couples the application views to the system models. This coupling relationship limits the functionality and expandability of the system. For example, in a multiple system model approach, all system status messages, errors and warnings must be communicated to each device interface. As a result, messages regarding a particular device function are sent to a user interface regardless as to whether the user is actively using that device. Specifically, from an error message standpoint, if a first user is sending a fax on a multi-function device, while a remote user sends a network print job that jams the printing device, the first user sending the fax will get an error message displayed on the user interface indicating the jam from the fax that requires the first user to respond to the error message. Moreover, from a functionality standpoint, the remote user sending the fax will not be allowed to continue with the faxing application until the paper jam has been cleared.

Accordingly, the embodiments described hereinafter were developed in light of these and other drawbacks associated with a marking device that employs a multiple system model approach to data and application management.

BRIEF DESCRIPTION OF THE DRAWINGS

The present embodiments will now be described, by way of example, with reference to the accompanying drawings, in which.

DETAILED DESCRIPTION

A system and method are provided for managing device functions in an embedded marker system (i.e., a marking device with an embedded controller). In one embodiment, the embedded marker system is a multi-function printer that includes a collection of devices (i.e., the printer, scanner, fax, and other digital sending devices) that work together to provide applications to a user. The devices are accessed by the user through a plurality of user interfaces, including, but not limited to, control panels, embedded web servers (EWS), web jet admins (WJA), and print drivers. The user interfaces allow the user to navigate through the device functions to a particular application. The applications are associated with application views, which are application infrastructures that obtain data, including the state of a given device, from a single system model. The application views are communicatively coupled to the system model by a common software bus protocol. The system model includes a central database that serves as a common data storage containing all device status and configuration data. In this way, there is one common and consistent system model for all application views. As a result, the application views are decoupled from the system model, allowing for the addition or modification of application views without affecting the system model.

Moreover, the decoupling of the application views from the system model allows for targeted status and error messaging. In other words, a user is only subjected to status and error information related to the device in which the user is currently using.

Figure 1:
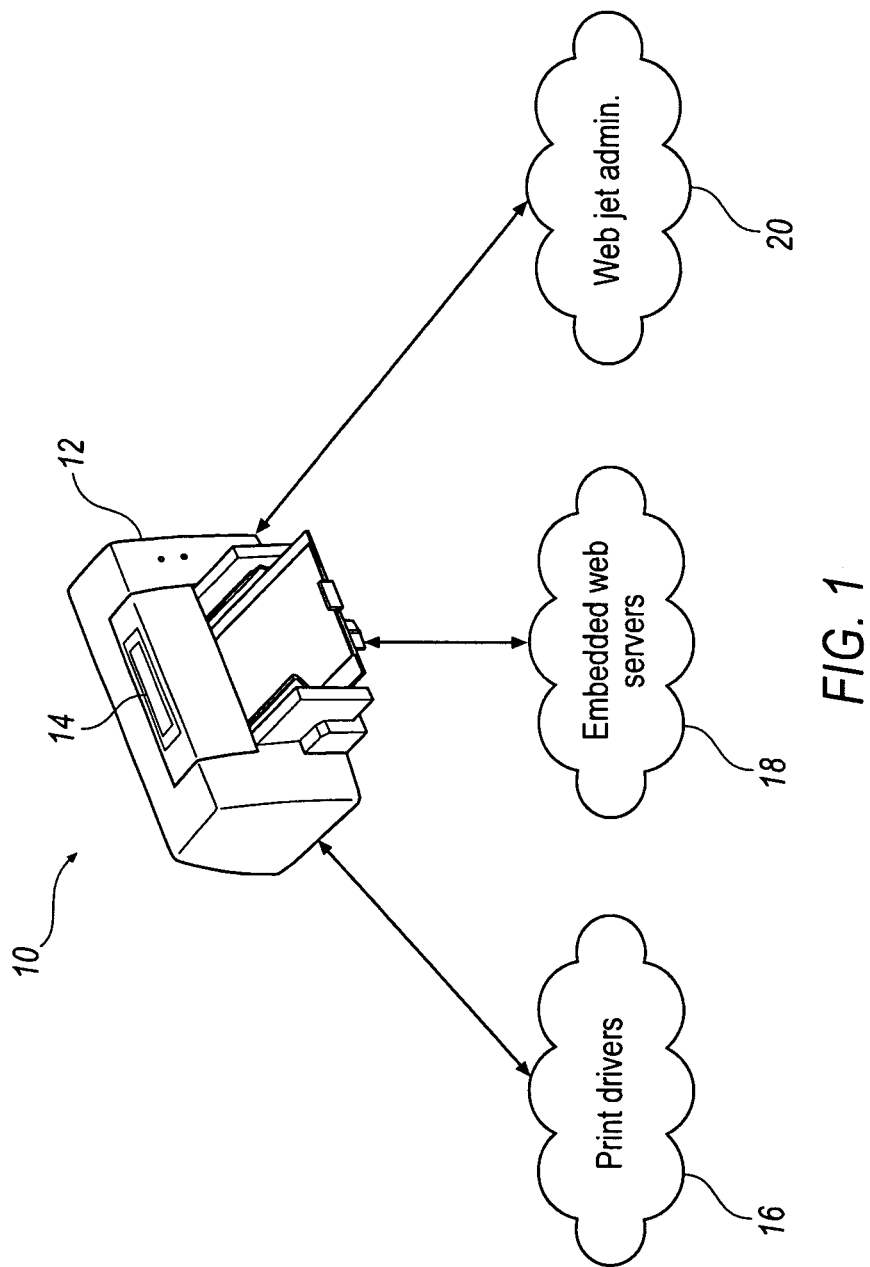
FIG. 1 illustrates an exemplary multi-function printer configuration according to an embodiment.

FIG. 1 illustrates an exemplary embedded marker system 10 that includes a multi-function printer 12 and a plurality of user interface devices including a control panel 14, print drivers 16, an embedded web server (EWS) 18, and web jet admin (WJA) software 20. The control panel is mounted to a front face of the multi-function printer 12 and serves as a direct user interface to all available device functions (i.e., printing, faxing, scanning, emailing, etc.). In addition, the control panel 14 provides an interface for communicating prompts, errors, warnings, and other status information to the user.

The EWS 18 and WJA 20 are proprietary applications used to remotely manage the device functions of multi-function printer 12. The EWS 18 and WJA 20 generally reside on a host computer (not shown) that is connected to the multi-function printer through a network (not shown). The EWS 18 and WJA 20 communicate with the devices of the multi-function printer 12 to allow the user to control and track device status and applications remotely, rather than directly through the control panel 14. Using utility functions of the EWS 18 and WJA 20, the user has access to all multi-function printer 12 status information, including toner/ink supply, paper supply, and device usage status.

In an alternative embodiment, remote management of the device functions of multi-function printer 12 can be implemented using any suitable non-proprietary software that is capable of performing the management functions as described above.

Figure 2:
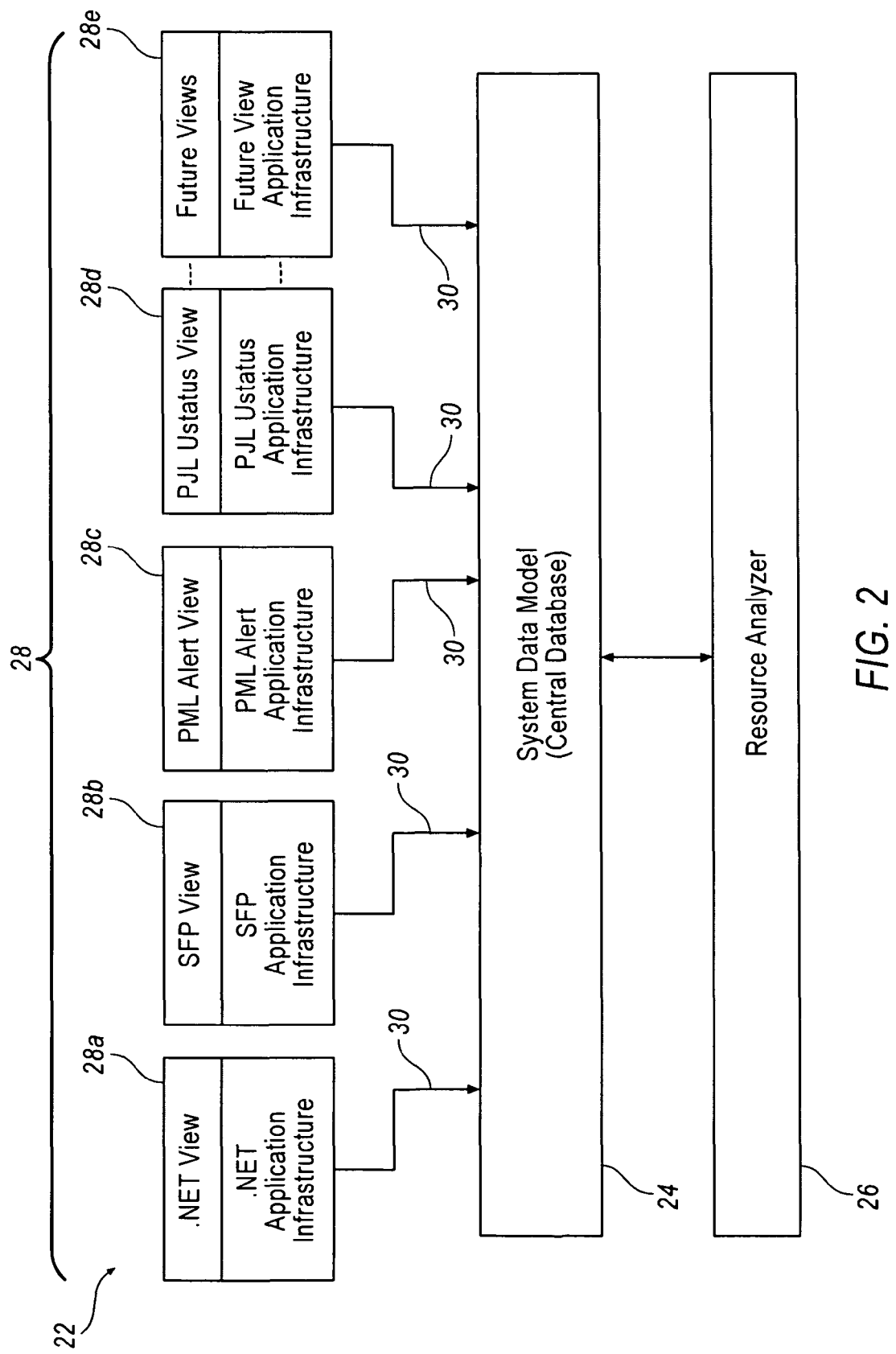
FIG. 2 illustrates an exemplary system structure according to the multi-function printer configuration of FIG. 1.

FIG. 2 illustrates an exemplary system structure 22 for the multi-function printer 12 of FIG. 1 implementing a single system model. The exemplary structure includes a system data model 24 communicatively coupled to a resource analyzer 26, which detects from hardware the state of each print device function. The system data model 24 includes a central database, which stores device status and configuration data for all device functions. The system data model 24 is in further communication with a plurality of application views 28 through a common software bus protocol 30, such as, but not limited to, TCP/IP (transmission control protocol/internet protocol), ORB (Object Request Brokering), and RPC (Remote Procedure Call).

When a user initiates an application through a user interface, the application view 28 is configured to obtain the necessary status and configuration data from the central database in the system data model 24 to implement the given application. For example, in one embodiment, the .NET application view 28a is configured to manage the copy, fax, print, email, and scan to folder functions, while the SFP (single function printer) application view 28b is configured to provide status information relating to the device functions. The PML (printer mode language) and PJL (printer job language) application views are subset applications of the EWS 18 and WJA 20 application views and are configured to remotely manage the device functions. In the embodiment shown in FIG. 2, application view 28e has been reserved for the expansion of future application views. As understood by one of ordinary skill in the art, the application views 28 in FIG. 2 are not limited to the configurations discussed above and can be customized and expanded according to any marking system design specifications.

Figure 3:
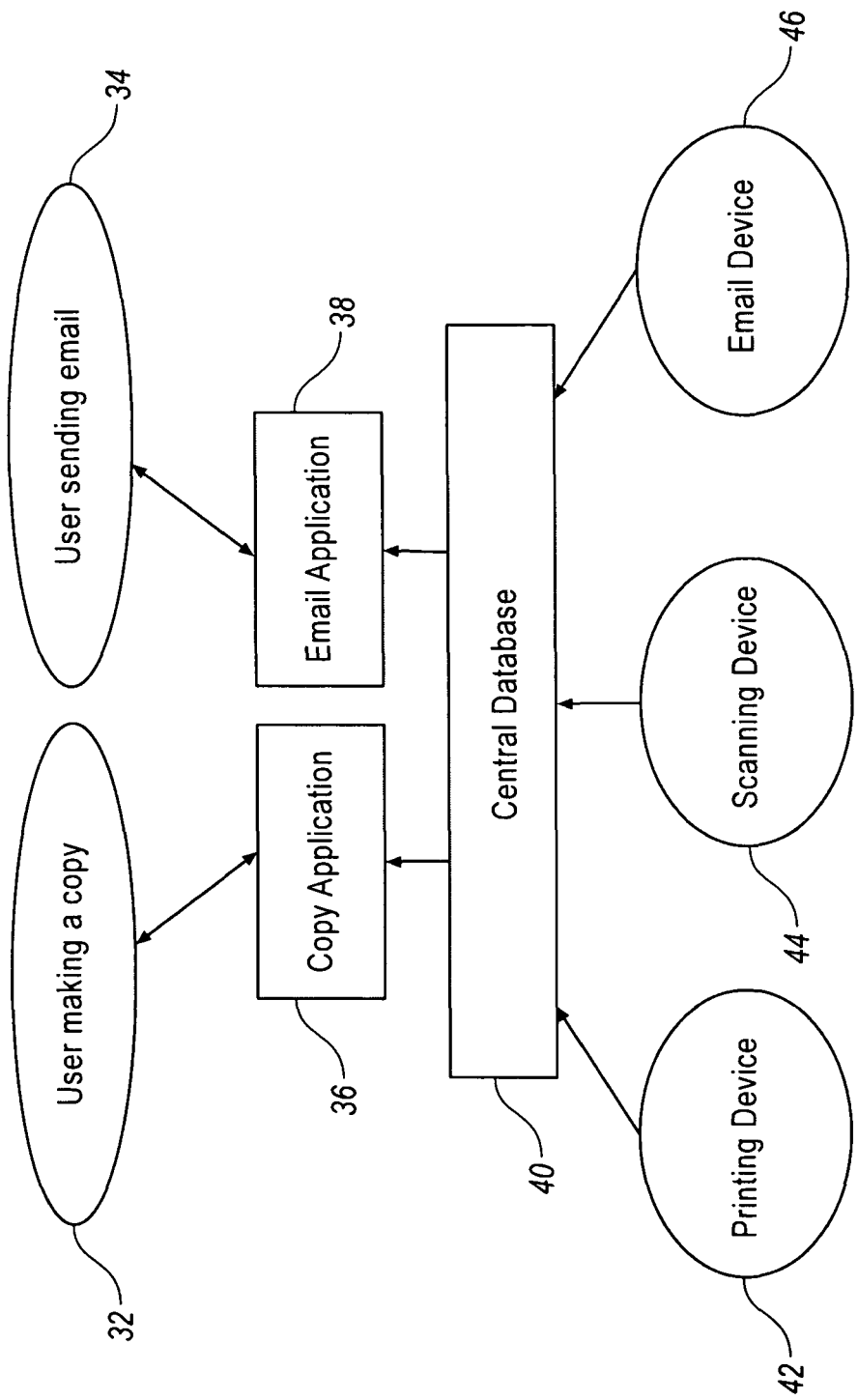
FIG. 3 illustrates an exemplary communication structure according to the system of FIG. 2.

FIG. 3 illustrates an exemplary communication structure for the system of FIG. 2, wherein users are concurrently using the multi-function printer 12 to make a copy 32 and send an email 34 from different user interfaces (not shown in FIG. 3). Both the copy 36 and email 38 application views communicate independently from one another to the central database 40. The application views 36, 38 are configured to access from the central database 40 only status and configuration data that relate to the specific application requested by the user. In other words, the central database does not mass distribute status and configuration data regarding the printing 42, scanning 44, and email 46 devices to all user interfaces unless the information is requested by a particular application view. The system data model 24, and the central database 40 contained therein, are completely unaware of specific application views.

Figure 4:
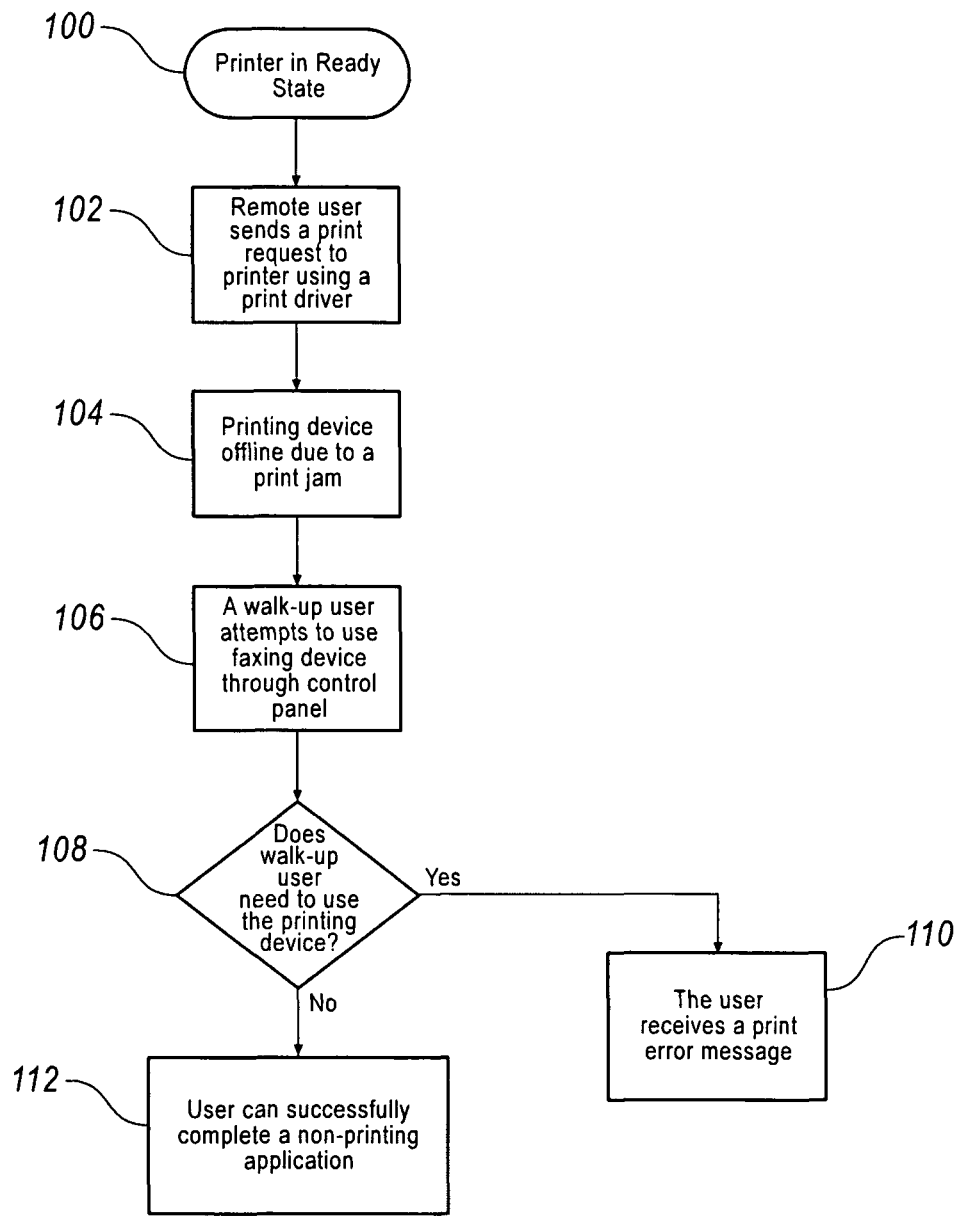
FIG. 4 is a flow chart illustrating an exemplary sequence for managing multiple device functions according to an embodiment.

FIG. 4 is a flow chart illustrating an exemplary sequence for managing multiple device functions according to the system structure of FIGS. 2 and 3. As understood by one of ordinary skill in the art, the above-described sequence is exemplary and can be applied to any combination of device functions. References to physical components refer to those exemplary components illustrated in FIGS. 1-3. At step 100, the multi-function printer 12 is in a ready state. A remote user at step 102 sends a print job to the printer 12 using a print driver. At step 104 a paper jam occurs causing the printing device 42 to go offline. At step 106, a walk-up user attempts to use the faxing device of multi-function printer 12 from the user control panel 14. At step 108, the system 10 determines whether the user is attempting to initiate a function that utilizes the printing device 42. If so, the user at step 110 receives a print error message and is prevented from using the printing device 42. If, however, the user is attempting to utilize a device function other than the printing device 42, such as a digital send, scan, fax, or scan to folder application, the user at step 112 is allowed to successfully complete the non-printing application, which in this example is a fax. Note that in the event that the user is attempting to initiate a non-printing application, the control panel would not display any status or error information related to the jam at the printing device 42.

While the present invention has been particularly shown and described with reference to the foregoing preferred embodiment, it should be understood by those skilled in the art that various alternatives to the embodiments of the invention described herein may be employed in practicing the invention without departing from the spirit and scope of the invention as defined in the following claims. It is intended that the following claims define the scope of the invention and that the method and system within the scope of these claims and their equivalents be covered thereby. This description of the invention should be understood to include all novel and non-obvious combinations of elements described herein, and claims may be presented in this or a later application to any novel and non-obvious combination of these elements. The foregoing embodiment is illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A system, comprising:
a plurality of devices, at least one of said plurality of devices configured to perform a print function;
a single system model communicatively coupled to said plurality of devices, said single system model comprising a central database configured to dynamically store all status and configuration data for each device in said plurality of devices, said status and application data comprising current error messages of each device; and
a plurality of application views, each said application view being configured to independently communicate only with said central database of said system model to obtain status and configuration data associated with one of said plurality of devices, wherein said central database only distributes error messages to a particular application view making a request and only distributes error messages for a device that said particular application view controls; and wherein said central database does not mass distribute error messages to all application views.

2. The system of claim 1, further including at least one user interface configured to initiate an application on at least one of said plurality of devices.

3. The system of claim 2, wherein said at least one user interface is configured to display status information and error messages associated with a given device.

4. The system of claim 1, further including a data interface for communicatively coupling each of said plurality of application views to said single system model.

5. The system of claim 4, wherein said data interface is a software bus protocol.

6. The system of claim 1, wherein said plurality of application views includes an application infrastructure from at least one of a control panel, a printer job language, a single function printer, and a printer mode language.

7. The system of claim 1, wherein said plurality of devices includes at least one of a printing device, a scanning device, a faxing device, and a digital sending device.

8. The system of claim 1, wherein said central database is unable to distinguish a first application view from a second application view.

9. The system of claim 1, wherein a first device function is executed independently of a second device function.

10. The system of claim 1, wherein said plurality of application views are configured to implement an application associated with said one of said plurality of devices independently of a status of another of said plurality of devices.

11. The system of claim 1, further comprising a resource analyzer to detect a state of each of said plurality of devices and report said state to said central database.

12. An electronic device, comprising:
a plurality of application views;
a single system model communicatively coupled to said plurality of application views, said single system model comprising a central database configured to store all status and configuration data for said electronic device;
wherein said plurality of application views are configured to obtain status and configuration data only from said central database of said single system model to execute a device function independent of a status of another device function, wherein at least one of the device functions includes a print function; and
wherein said plurality of application views are decoupled from said single system model to permit addition and modification of application views without affecting said single system model and wherein a portion of said status data is displayed to a user by a control panel.

13. The device of claim 12, wherein said plurality of application views are independently communicatively coupled to at least one user interface.

14. The device of claim 13, wherein said at least one user interface is configured to receive status and error messages related to a given device function.

15. The device of claim 12, wherein said device functions include at least one of printing, faxing, scanning, and emailing.

16. The device of claim 12, wherein said plurality of application views includes an application infrastructure from at least one of a control panel, a printer job language, a single function printer, and a printer mode language.

17. The device of claim 12, wherein said central database is unable to distinguish a first application view from a second application view such that said central database distributes error data requested by a particular application view only to that particular application view.

18. The device of claim 12, wherein said central database is to distribute error data requested by a particular application view only to that application view and does not mass distribute status and configuration data to all application views.

19. A method comprising:
initiating a first device function through a first application view from a first user interface;
obtaining, through said first application view and only from a central database of a single system model, error data relating to malfunctions of said first device function;
initiating a second device function through a second application view from a second user interface; and
obtaining, through said second application view and only from said central database of said single system model, error data relating to malfunctions of said second device function;
wherein said central database only distributes error data requested by a particular application view to that application view and does not mass distribute status and configuration data to all application views; and
wherein at least one of said first and second device functions includes a print function, and said second device function is executed independently of a status of said first device function.

20. The method of claim 19, wherein said second device function is executed if an error occurs with said first device function when said second device function is not the same as said first device function.

21. The method of claim 19, wherein said second device function is not executed if an error occurs with said first device function when said second device function is the same as said first device function.

22. The method of claim 19, wherein said first application view is the same as said second application view.

23. The method of claim 19, wherein said plurality of devices includes at least one of a printing, faxing, scanning, and emailing device.

24. The method of claim 19, further comprising storing all status and configuration data for each of said device functions in said central database of said single system model.

\* \* \* \* \*